(12) United States Patent
Huang

(10) Patent No.: US 10,921,557 B2
(45) Date of Patent: Feb. 16, 2021

(54) OPTICAL IMAGING SYSTEM OF CAMERA LENS ASSEMBLY

(71) Applicant: Zhejiang Sunny Optical Co., Ltd, Ningbo (CN)

(72) Inventor: Lin Huang, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 398 days.

(21) Appl. No.: 15/772,860

(22) PCT Filed: Aug. 9, 2017

(86) PCT No.: PCT/CN2017/096589
§ 371 (c)(1),
(2) Date: May 2, 2018

(87) PCT Pub. No.: WO2018/188236
PCT Pub. Date: Oct. 18, 2018

(65) Prior Publication Data
US 2020/0257081 A1   Aug. 13, 2020

(30) Foreign Application Priority Data
Apr. 12, 2017 (CN) .......................... 2017 1 0236524
Apr. 12, 2017 (CN) ..................... 2017 2 0379889 U

(51) Int. Cl.
*G02B 13/00* (2006.01)
*G02B 9/34* (2006.01)
(Continued)

(52) U.S. Cl.
CPC .............. *G02B 13/004* (2013.01); *G02B 9/34* (2013.01); *G02B 13/146* (2013.01); *G02B 27/0025* (2013.01)

(58) Field of Classification Search
CPC .... G02B 13/004; G02B 9/34; G02B 27/0025; G02B 13/0045; G02B 9/60; G02B 9/62; G02B 9/64; G02B 13/146
(Continued)

(56) References Cited

U.S. PATENT DOCUMENTS

| 4,376,571 A * | 3/1983 | Ikemori | .................... G02B 9/60 359/768 |
| 6,233,101 B1 * | 5/2001 | Takatsuki | ................. G02B 9/60 359/768 |

(Continued)

FOREIGN PATENT DOCUMENTS

| CN | 105259636 A | 1/2016 |
| CN | 205049806 U | 2/2016 |

(Continued)

*Primary Examiner* — George G King
(74) *Attorney, Agent, or Firm* — Sughrue Mion, PLLC

(57) ABSTRACT

The present disclosure provides an optical imaging system of a camera lens assembly. The optical imaging system is sequentially provided with a first lens, a second lens, a third lens and a fourth lens from an object side to an imaging side along an optical axis. The first lens has a positive refractive power, an object side surface and an image side surface of the first lens are both convex surface. An object side surface of the second lens is a convex surface, and an image side surface of the second lens is a convex surface. The third lens has a negative refractive power and the fourth lens has a negative refractive power. An effective focal length of the first lens f1, an effective focal length of the fourth lens f4, and an effective focal length of the optical imaging system f satisfy: $-0.8<(f1+f4)/f<0$.

19 Claims, 10 Drawing Sheets

(51) Int. Cl.
*G02B 13/14* (2006.01)
*G02B 27/00* (2006.01)

(58) Field of Classification Search
USPC .................................................. 359/715, 772
See application file for complete search history.

(56) References Cited

U.S. PATENT DOCUMENTS

| | | |
|---|---|---|
| 6,744,570 B1 | 6/2004 | Isono |
| 9,507,124 B2 | 11/2016 | Huang et al. |
| 2009/0128927 A1 | 5/2009 | Chen et al. |
| 2012/0293876 A1 | 11/2012 | Tsai |
| 2014/0184880 A1* | 7/2014 | Ahn ...................... G02B 13/004 348/342 |
| 2014/0293454 A1* | 10/2014 | Kondo ...................... G02B 9/60 359/714 |
| 2015/0241659 A1 | 8/2015 | Huang |
| 2016/0170184 A1 | 6/2016 | Tsai et al. |
| 2017/0269330 A1 | 9/2017 | Jhang et al. |
| 2017/0351064 A1* | 12/2017 | Chang ...................... G02B 9/34 |
| 2018/0059372 A1 | 3/2018 | Cheng et al. |
| 2018/0059373 A1 | 3/2018 | Chen et al. |
| 2018/0059374 A1 | 3/2018 | Chen et al. |

FOREIGN PATENT DOCUMENTS

| | | | | |
|---|---|---|---|---|
| CN | 106324804 A | * | 1/2017 | ........... G02B 13/004 |
| CN | 106526790 A | * | 3/2017 | ........... G02B 13/005 |
| CN | 106802477 A | | 6/2017 | |
| JP | 2009-288377 A | | 12/2009 | |

\* cited by examiner

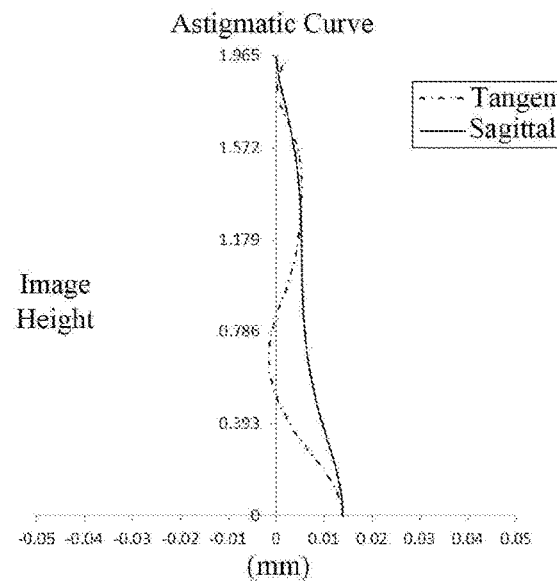
Fig. 4B
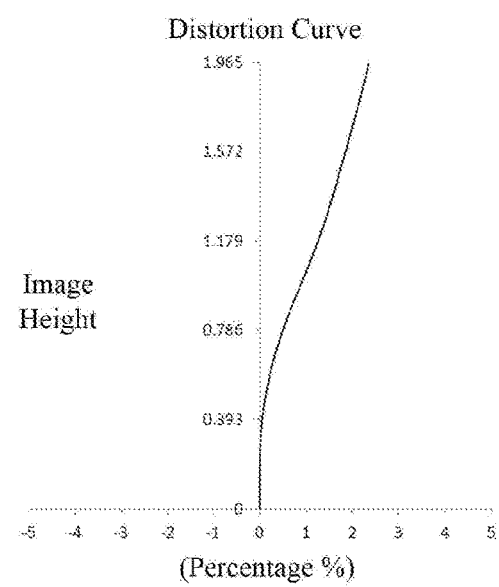
Fig. 4C
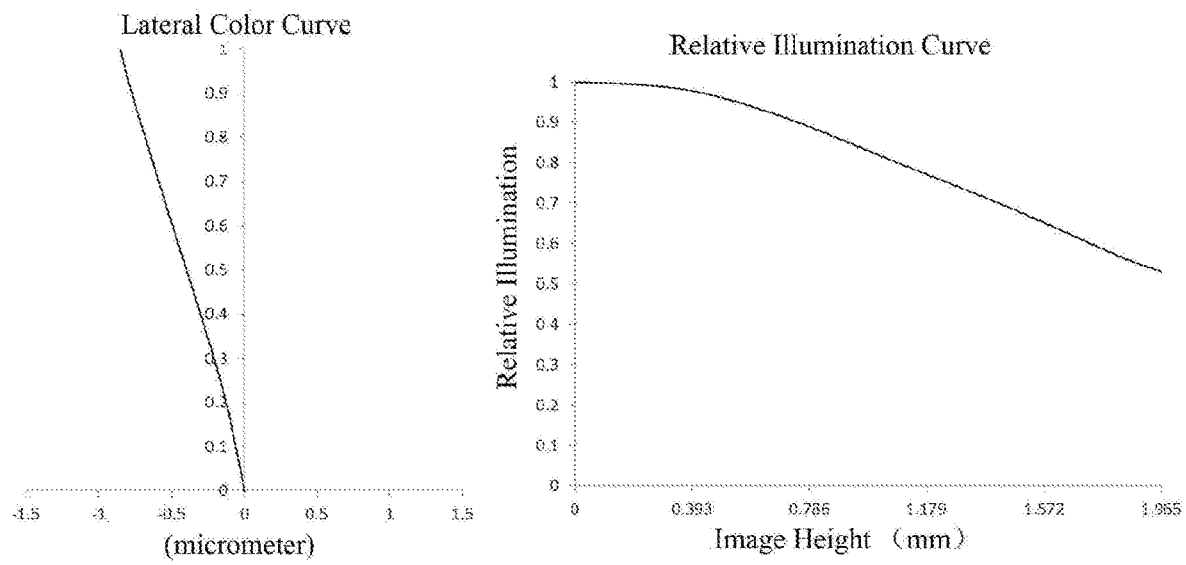
Fig. 4D
Fig. 4E

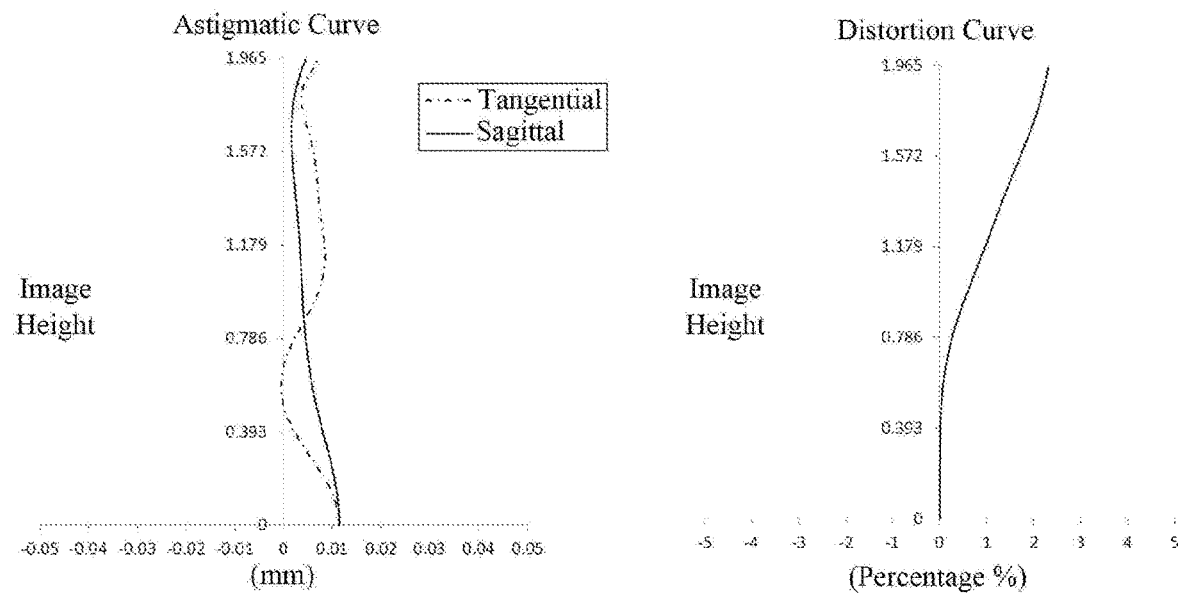
Fig. 6B
Fig. 6C
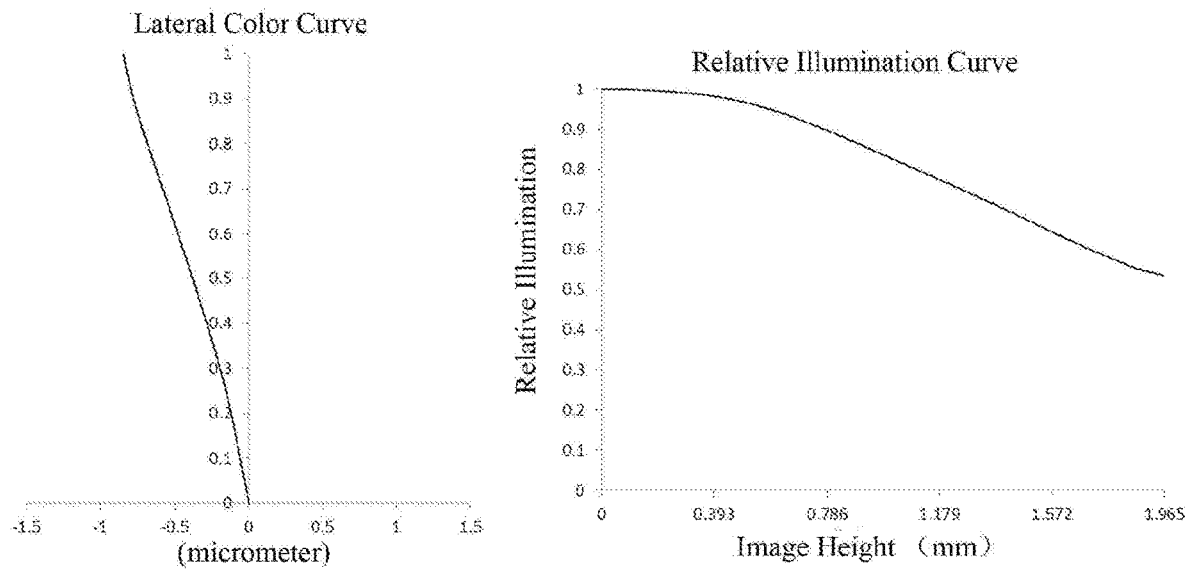
Fig. 6D
Fig. 6E

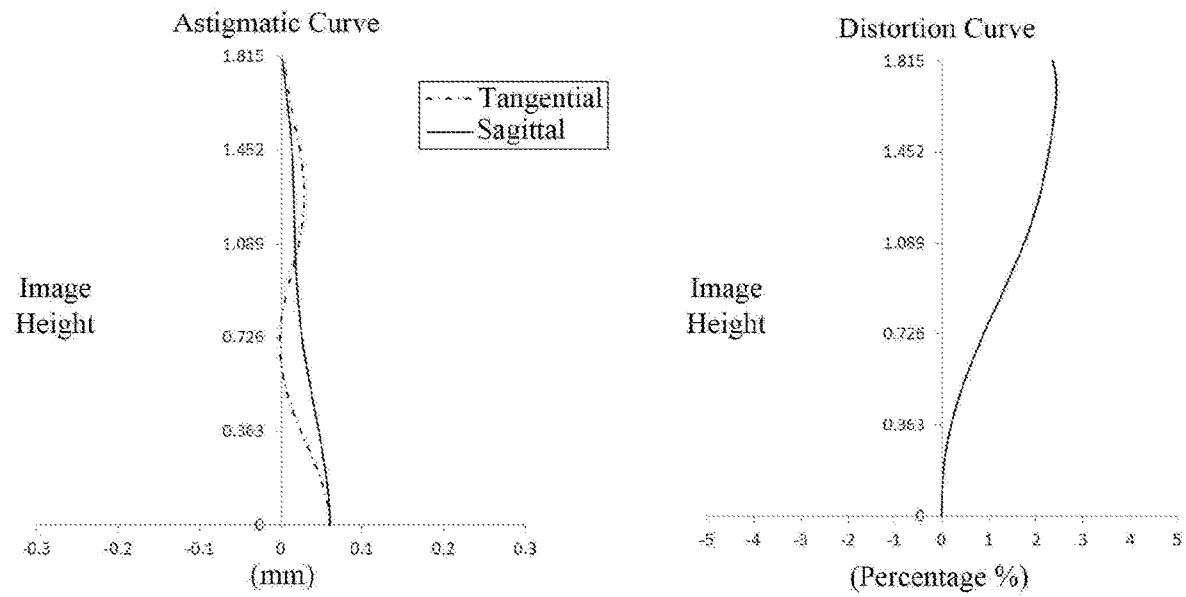
Fig. 10B
Fig. 10C
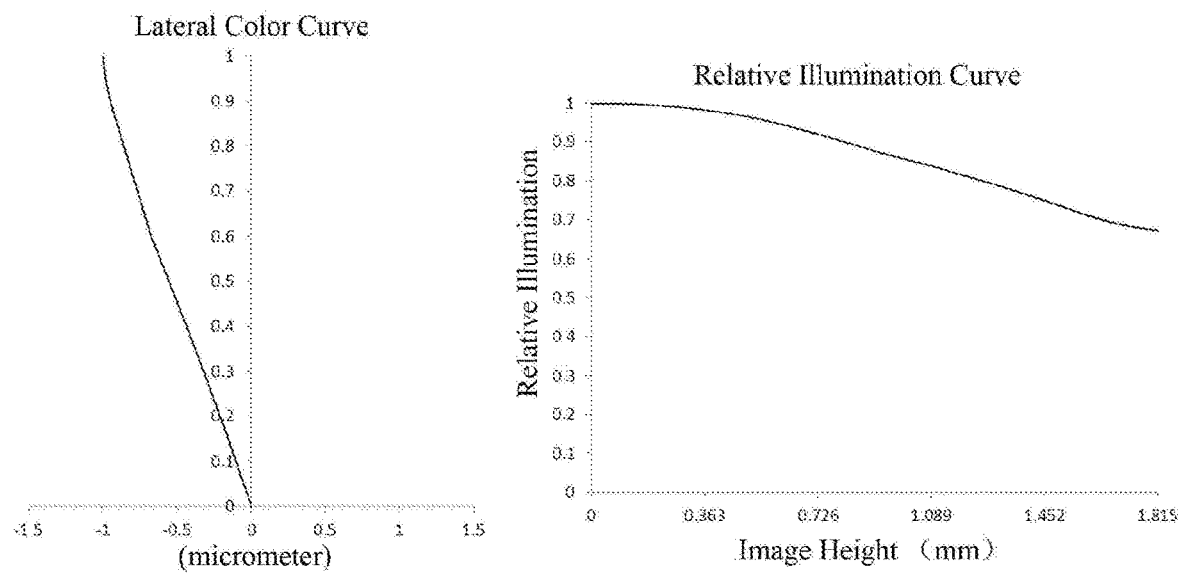
Fig. 10D
Fig. 10E

OPTICAL IMAGING SYSTEM OF CAMERA LENS ASSEMBLY

CROSS-REFERENCE TO RELATED APPLICATION

This application is a National Stage of International Application No. PCT/CN2017/096589 filed Aug. 9, 2017 which claims the priorities and rights from Chinese Patent Application No. 201710236524.4 and Chinese Patent Application No. 201720379889.8, filed with the State Intellectual Property Office of China (SIPO) on Apr. 12, 2017, the disclosures of which are hereby incorporated by reference in their entireties.

TECHNICAL FIELD

The present disclosure relates to an optical imaging system, and more specifically to an optical imaging system including multiple lenses.

BACKGROUND

In recent years, as the science and technology develops, portable electronic products are gradually emerging. In particular, portable electronic products having camera functions are increasingly liked. Photosensitive elements of general optical systems are generally a photosensitive charge-coupled device (CCD) or a complementary metal-oxide semiconductor element (CMOS). As the semiconductor processing technology improves, the optical systems tend to have more pixels, and the pixel sizes of the chips become smaller and smaller. Accordingly, requirements on the image quality of the optical systems used in combination become higher and higher. In the security and protection field in particular, requirements on lens assemblies with iris recognition become higher and higher. Not only ensuring a compact structure is needed, higher brightness and resolution are also required, to greatly improve the recognition accuracy of the lens assembly.

SUMMARY

The present disclosure is intended to provide a compact-type optical imaging system having high brightness and high resolution.

An optical imaging system is provided according to an aspect of the present disclosure. The optical imaging system may be sequentially provided with a first lens, a second lens, a third lens and a fourth lens from an object side to an imaging side along an optical axis. The first lens may have a positive refractive power, an object side surface of the first lens is a convex surface, and an image side surface of the first lens may be a concave surface. An object side surface of the second lens is a convex surface, and an image side surface of the second lens may be a concave surface. The third lens and the fourth lens may have negative refractive powers. An effective focal length of the first lens f1, an effective focal length of the fourth lens f4, and an effective focal length of the optical imaging system f satisfy: $-0.8<(f1+f4)/f<0$, for example, $-0.772 \leq (f1+f4)/f \leq -0.356$.

An optical imaging system is provided according to another aspect of the present disclosure. The optical imaging system may be sequentially provided with a first lens, a second lens, a third lens and a fourth lens from an object side to an imaging side along an optical axis. The first lens may have a positive refractive power, an object side surface of the first lens is a convex surface, and an image side surface of the first lens may be a concave surface. An object side surface of the second lens is a convex surface, and an image side surface of the second lens may be a concave surface. The third lens and the fourth lens may have negative refractive powers. A center thickness of the first lens on the optical axis CT1 and a center thickness of the fourth lens on the optical axis CT4 satisfy: $0.4<CT4/CT1<0.8$, for example, $0.498 \leq CT4/CT1 \leq 0.634$.

According to implementations of the present disclosure, an aperture diaphragm is arranged between an object being photographed and the second lens.

According to the implementations of the present disclosure, an effective focal length of the third lens f3 and the effective focal length of the fourth lens f4 satisfy: $1<f3/f4<3$, for example, $1.259 \leq f3/f4 \leq 2.710$.

According to the implementations of the present disclosure, an effective radius of the object side surface of the first lens DT11 and an effective radius of the object side surface of the second lens DT21 satisfy: $1.2<DT11/DT21<1.8$, for example, $1.269 \leq DT11/DT21 \leq 1.714$.

According to the implementations of the present disclosure, the center thickness of the first lens on the optical axis CT1 and a center thickness of the third lens on the optical axis CT3 satisfy: $2.5<CT1/CT3<3.1$, for example, $2.538 \leq CT1/CT3 \leq 3.06$.

According to the implementations of the present disclosure, a radius of curvature of the image side surface of the first lens R2 and a radius of curvature of the object side surface of the second lens R3 satisfy: $1.3<R2/R3<1.9$, for example, $1.393 \leq R2/R3 \leq 1.870$.

According to the implementations of the present disclosure, the radius of curvature of the image side surface of the first lens R2 and a radius of curvature of the image side surface of the second lens R4 satisfy: $1<R2/R4<2.1$, for example, $1.28 \leq R2/R4 \leq 2.059$.

According to the implementations of the present disclosure, a distance from the object side surface of the first lens to an image plane on the optical axis TTL and the effective focal length of the optical imaging system f satisfy: $TTL/f<1$, for example, $TTL/f \leq 0.941$.

According to the implementations of the present disclosure, an axial distance from an intersection point of an image side surface of the third lens and the optical axis to a vertex of an effective radius of the image side surface of the third lens SAG32 and the center thickness of the third lens on the optical axis CT3 satisfy: $-0.7<SAG32/CT3<-0.3$, for example, $-0.601 \leq SAG32/CT3 \leq -0.413$.

In addition, the distance from the object side surface of the first lens to the image plane on the optical axis TTL and the center thickness of the fourth lens on the optical axis CT4 may satisfy: $CT4/TTL<0.1$, for example, $CT4/TTL \leq 0.093$.

According to the implementations of the present disclosure, an effective radius of an image side surface of the fourth lens DT42 and ImgH, ImgH being half a diagonal length of an effective pixel area of an electronic photosensitive element, satisfy: $0.5<DT42/ImgH<0.9$, for example, $0.742 \leq DT42/ImgH \leq 0.784$.

In the present disclosure, multiple lenses (e.g., four lenses) are used. By reasonably distributing the refractive powers, surface types of the lenses, the axial spacing distances between the lenses, etc., the optical imaging system can possess at least one of the following advantages:
 effectively enlarging an aperture of the lens assembly;
 shortening a total length of the lens assembly;
 ensuring an effective clear diameter of the lens assembly;

ensuring compactness of the system;
correcting various aberrations; and
improving resolution and an image quality of the lens assembly.

BRIEF DESCRIPTION OF THE DRAWINGS

The above and other advantages of the implementations according to the present disclosure will become apparent through detailed description given with reference to the accompanying drawings, and the accompanying drawings are intended to illustrate the exemplary implementations of the present disclosure, rather than limit the exemplary implementations of the present disclosure. In the accompanying drawings:

FIG. 4B illustrates an astigmatic curve of the optical imaging system according to Embodiment 2;

FIG. 4C illustrates a distortion curve of the optical imaging system according to Embodiment 2;

FIG. 4D illustrates a lateral color curve of the optical imaging system according to Embodiment 2;

FIG. 4E illustrates a relative illumination curve of the optical imaging system according to Embodiment 2;

FIG. 6B illustrates an astigmatic curve of the optical imaging system according to Embodiment 3;

FIG. 6C illustrates a distortion curve of the optical imaging system according to Embodiment 3;

FIG. 6D illustrates a lateral color curve of the optical imaging system according to Embodiment 3;

FIG. 6E illustrates a relative illumination curve of the optical imaging system according to Embodiment 3;

FIG. 10B illustrates an astigmatic curve of the optical imaging system according to Embodiment 5;

FIG. 10C illustrates a distortion curve of the optical imaging system according to Embodiment 5;

FIG. 10D illustrates a lateral color curve of the optical imaging system according to Embodiment 5; and FIG. 10E illustrates a relative illumination curve of the optical imaging system according to Embodiment 5.

DETAILED DESCRIPTION OF EMBODIMENTS

Figure 1:
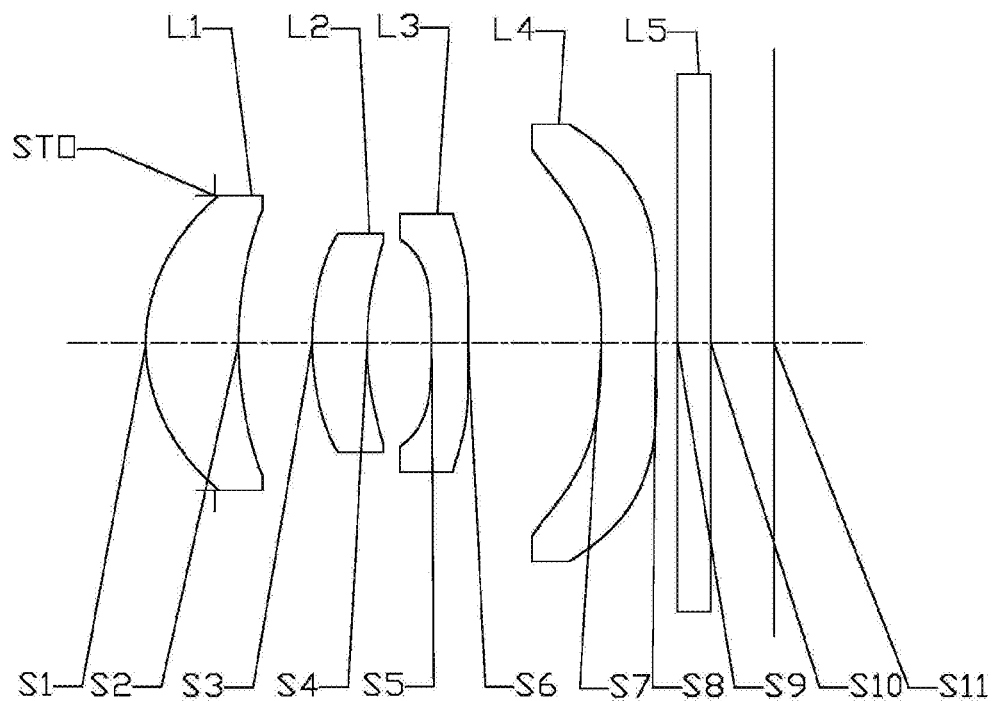
FIG. 1 illustrates a schematic structural diagram of an optical imaging system according to Embodiment 1 of the present disclosure.

Various aspects of the present disclosure will be described in more detail with reference to the accompanying drawings, so as to better understand the present disclosure. It should be appreciated that the detailed description is merely an explanation for exemplary implementations of the present disclosure, rather than a limitation to the scope of the present disclosure in any way. The same reference numerals designate the same elements throughout this specification. The expression "and/or" includes any and all combinations of one or more of the associated listed items.

It should be noted that, in the present specification, expressions, such as "first," "second" and "third" are merely used to distinguish one feature from another, not to represent any limitation to the feature. Thus, a first lens discussed below may also be termed a second lens or a third lens without departing from the teachings of the present disclosure.

In the accompanying drawings, for the convenience of the description, the thicknesses, sizes and shapes of the lenses have been slightly exaggerated. However, it should be appreciated that sizes of various components may be adjusted in a certain range, without being defined by the accompanying drawings. Specifically, shapes of spherical surfaces or aspheric surfaces shown in the accompanying drawings are illustrated by way of examples. That is, shapes of the spherical surfaces or the aspheric surfaces are not limited to the shapes of the spherical surfaces or the aspheric surfaces shown in the accompanying drawings. The accompanying drawings are merely examples, not strictly drawn to scale.

In addition, a paraxial area indicates an area near an optical axis. The first lens is a lens closest to an object, and a fourth lens is a lens closest to a photosensitive element. In the present disclosure, a surface closest to the object in each lens is referred to as an object side surface, and a surface closest to an image plane in each lens is referred to as an image side surface.

It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or combinations thereof. In addition, expressions, such as "at least one of," when preceding a list of elements, modify the entire list of elements rather than an individual element in the list. Further, the use of "may", when describing implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The present disclosure provides an optical imaging system. According to the exemplary implementations of the present disclosure, the optical imaging system may be sequentially provided with a first lens, a second lens, a third lens and a fourth lens from an object side to an imaging side along an optical axis. The optical imaging system may have an effective focal length f.

In the exemplary implementations, the first lens may have a positive refractive power, an object side surface of the first lens may be a convex surface, and an image side surface of the first lens may be a concave surface. The first lens having the positive refractive power has a large refractive power, and the image side surface of the first lens is set to be a concave surface, which is conducive to shortening the total length of the optical imaging system and reducing the volume of the optical imaging system, thereby realizing miniaturization of the lens assembly.

The second lens has a refractive power, an object side surface of the second lens may be a convex surface, and an image side surface of the second lens may be a concave surface. The second lens having the refractive power may reduce an angle of the off-axial field of view between a ray of light and the optical axis, thereby improving the astigmation of the off-axial field of view to provide an image quality of the optical imaging system.

The third lens and the fourth lens have negative refractive powers.

In the exemplary implementations, the optical imaging system according to the present disclosure further includes an aperture diaphragm arranged between an object being photographed and the second lens. The optical imaging system according to the present disclosure further includes a filter arranged between the fourth lens and an image plane. The filter is an infrared (IR) filter, and a bandpass wavelength of the infrared (IR) filter, for example, ranges from 750 nm to 900 nm. In a certain wave band, only a small section in the middle of the bandpass filter is a pass band having a high transmittance, and both sides of the pass band are stop bands having a high reflectance. Appropriate passage of an infrared waveband may help the system not to introduce the influence of a chromatic aberration and control the diameter of a dispersive spot, and meanwhile, the infrared waveband helps to eliminate the interference of the environment visible light, thereby improving the image quality of the lens assembly. With this configuration, effective recognition of the optical imaging system in an effective spectral range is ensured.

In the exemplary implementations, a distance from the object side surface of the first lens to the image plane on the optical axis TTL and the effective focal length of the optical imaging system f may satisfy: $TTL/f<1$, and more specifically, may satisfy: $TTL/f\leq0.941$. In the situation that the effective recognition accuracy of the optical imaging system is ensured, the size of the optical imaging system is miniaturized, and meanwhile, the optical imaging system keeps a long focal length and has a wider focal depth.

In the exemplary implementations, the distance from the object side surface of the first lens to the image plane on the optical axis TTL and a center thickness of the fourth lens on the optical axis CT4 may satisfy: $CT4/TTL<0.1$, and more specifically, may satisfy: $CT4/TTL\leq0.093$. By reasonably distributing the shapes and positions of the lenses, peripheral relative illuminations may be effectively improved.

In the exemplary implementations, an effective radius of the object side surface of the first lens DT11 and an effective radius of the object side surface of the second lens DT21 may satisfy: $1.2<DT11/DT21<1.8$, and more specifically, may satisfy: $1.269\leq DT11/DT21\leq1.714$. When the lens assembly is assembled, such configuration is more conducive to the structure positioning stability, and reducing a bending deformation caused by the difference of positioning apertures of the first lens and the second lens, and may improve resolution of the lens assembly at the same time.

In the exemplary implementations, a radius of curvature of the image side surface of the first lens R2 and a radius of curvature of the object side surface of the second lens R3 may satisfy: $1.3<R2/R3<1.9$, and more specifically, may satisfy: $1.393\leq R2/R3\leq1.870$. By reasonably configuring the radii of curvature and shapes of the lenses, the relative illuminations can be improved, which is conducive to correcting an aberration, specially reducing a comatic aberration, so that the optical imaging system can have a high image quality.

In the exemplary implementations, the radius of curvature of the image side surface of the first lens R2 and a radius of curvature of the image side surface of the second lens R4 may satisfy: $1<R2/R4<2.1$, and more specifically, may satisfy: $1.28\leq R2/R4\leq2.059$. By reasonably configuring the radii of curvature and shapes of the lenses, the relative illuminations can be improved, which is conducive to correcting an aberration, specially reducing the aberration, thereby improving the resolution of the optical imaging system.

In the exemplary implementations, a center thickness of the first lens on the optical axis CT1 and a center thickness of the third lens on the optical axis CT3 may satisfy: $2.5<CT1/CT3<3.1$, and more specifically, may satisfy: $2.538\leq CT1/CT3\leq3.06$. By reasonably configuring the center thickness of the first lens and the center thickness of the second lens, the spherochromatic aberration of the optical imaging system can be effectively controlled.

In the exemplary implementations, the center thickness of the first lens on the optical axis CT1 and the center thickness of the fourth lens on the optical axis CT4 may satisfy: $0.4<CT4/CT1<0.8$, and more specifically, may satisfy: $0.498\leq CT4/CT1\leq0.634$. By matching the shape of the first lens with the shape of the fourth lens, the peripheral relative illuminations can be effectively improved.

In the exemplary implementations, an effective focal length of the first lens f1, an effective focal length of the fourth lens f4, and the effective focal length of the optical imaging system f may satisfy: $-0.8<(f1+f4)/f<0$, and more specifically, may satisfy: $-0.772\leq(f1+f4)/f\leq-0.356$. By reasonably distributing the refractive powers of the first lens and the fourth lens, the spherical aberration and the comatic aberration of the system can be effectively controlled, thereby improving the resolution and the image quality of the optical imaging system.

In the exemplary implementations, an effective focal length of the third lens f3 and the effective focal length of the fourth lens f4 may satisfy: 1<f3/f4<3, and more specifically, satisfy: 1.259≤f3/f4≤2.710. By reasonably distributing the refractive powers of the third lens and the fourth lens, the magnification of the optical imaging system in an application range is ensured, to guarantee an effective recognition accuracy; and the aberration may be reduced, to improve the resolution of the optical imaging system.

In the exemplary implementations, an axial distance from an intersection point of an image side surface of the third lens and the optical axis to a vertex of an effective radius of the image side surface of the third lens SAG32 and the center thickness of the third lens on the optical axis CT3 may satisfy: −0.7<SAG32/CT3<−0.3, and more specifically, may satisfy: −0.601≤SAG32/CT3≤−0.413. The third lens in such configuration has a large refractive power for the off-axial field of view, which is conducive to shortening the total length of the lens assembly. Meanwhile, this configuration may also reduce the aberration and improve the resolution of the optical imaging system.

In the exemplary implementations, the effective focal length of the third lens f3, the effective focal length of the fourth lens f4, and the effective focal length of the optical imaging system f may satisfy: −4.5<(f3+f4)/f<−3, and more specifically, may satisfy: −4.254≤(f3+f4)/f≤−3.386. By reasonably distributing the refractive powers of the third lens and the fourth lens and the effective focal length of the imaging system f, the magnification of the optical imaging system in an application range is ensured, to guarantee an effective recognition accuracy.

In the exemplary implementations, an effective radius of an image side surface of the fourth lens DT42 and ImgH, ImgH being half a diagonal length of an effective pixel area of an electronic photosensitive element, may satisfy: 0.5<DT42/ImgH<0.9, and more specifically, may satisfy: 0.742≤DT42/ImgH≤0.784. By reasonably configuring the half of the diagonal length of the effective pixel area on the image plane of the optical imaging system ImgH and the effective radius of the image side surface of the fourth lens DT42, an incident angle of a principal ray of light can be effectively controlled, and the peripheral relative illumination can be effectively improved.

The optical imaging system according to the implementations of the present disclosure may use multiple lenses (e.g., four lenses used in the present disclosure). However, it should be appreciated that the imaging system having four lenses is merely an example, rather than a limitation. By reasonably configuring the refractive powers, center thicknesses and surface types of the various lenses, the axial spacing distances between the various lenses, and so on, a compact-type optical imaging system having high brightness and high resolution may be provided. In the implementations of the present disclosure, at least one of the mirror surfaces of the lenses is an aspheric mirror surface. An aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has the advantages of improving a distorted aberration and an astigmatic aberration, which can make the visual field larger and more realistic. The use of the aspheric lens can eliminate as much as possible the aberration that occurs during imaging, thereby improving the image quality.

However, it should be understood by those skilled in the art that, in a situation without departing from the technical solution claimed by the present disclosure, the number of lenses forming the lens assembly may be changed, to obtain the various results and advantages described below. For instance, in the description of the Embodiment 1, an optical imaging system having four lenses is described as an example, but the optical imaging system is not limited to include four lenses. If necessary, the optical imaging system may also include other numbers of lenses.

Specific embodiments applicable to the optical imaging system of the above implementations will be further described below with reference to the accompanying drawings.

Embodiment 1

Embodiment 1 of the optical imaging system according to the above implementations of the present disclosure will be described below with reference to FIG. 1 to FIG. 2E. FIG. 1 illustrates a schematic structural diagram of an optical imaging system according to Embodiment 1 of the present disclosure.

As shown in FIG. 1, the optical imaging system according to Embodiment 1 includes, along an optical axis, four lenses L1-L4 arranged in sequence from an object side to an imaging side. A first lens L1 has an object side surface S1 and an image side surface S2, a second lens L2 has an object side surface S3 and an image side surface S4, a third lens L3 has an object side surface S5 and an image side surface S6, and a fourth lens L4 has an object side surface S7 and an image side surface S8. In this embodiment, the first lens may have a positive refractive power, the object side surface of the first lens is a convex surface, and the image side surface of the first lens may be a concave surface. The second lens may have a positive refractive power or a negative refractive power, the object side surface of the second lens is a convex surface, and the image side surface of the second lens may be a concave surface. The third lens and the fourth lens may have negative refractive powers. The optical imaging system further includes a filter L5 having an object side surface S9 and an image side surface S10. The filter is an infrared (IR) filter, and a bandpass wavelength of the infrared (IR) filter ranges from 750 nm to 900 nm. In the optical imaging system according to this embodiment, an aperture STO is also provided to adjust the amount of light admitted. Light from an object sequentially passes through the surfaces S1 to S10 and finally forms an image on an image plane S11.

Table 1 below shows the effective focal lengths of the lenses f1-f4, the effective focal length of the optical imaging system f, the half of the diagonal length of the effective pixel area of the electronic photosensitive element ImgH, the half of the maximum field-of-view angle of the optical imaging system HFOV, the f-number of the optical imaging system Fno and the total length of the camera lens TTL in Embodiment 1.

TABLE 1

| | Parameter | | | | |
|---|---|---|---|---|---|
| | ImgH (mm) | HFOV (°) | Fno | f (mm) | f1 (mm) |
| Numerical Value | 1.965 | 23.929 | 2.19 | 4.235 | 3.585 |

| | Parameter | | | |
|---|---|---|---|---|
| | f2 (mm) | f3 (mm) | f4 (mm) | TTL (mm) |
| Numerical Value | 28.471 | −8.567 | −5.5774 | 3.980 |

Referring to Table 1, the distance from the object side surface of the first lens to the image plane on the optical axis TTL and the effective focal length of the optical imaging system f satisfy: TTL/f=0.940. The effective focal length of the first lens f1, the effective focal length of the fourth lens f4, and the effective focal length of the optical imaging system f satisfy: −0.8<(f1+f4)/f=−0.517. The effective focal length of the third lens f3 and the effective focal length of the fourth lens f4 satisfy: f3/f4=1.484. The effective focal length of the third lens f3, the effective focal length of the fourth lens f4, and the effective focal length of the optical imaging system f satisfy: (f3+f4)/f=−3.386.

Table 2 shows the surface types, the radii of curvature, the thicknesses, the materials and the conic coefficients of the lenses in Embodiment 1.

In this embodiment, an optical imaging system having four lenses is used as an example. By reasonably distributing the focal lengths and surface types of the lenses, an aperture of the lens assembly is effectively enlarged, and a total length of the lens assembly is effectively reduced, thereby ensuring a large aperture and miniaturization of the lens assembly. Meanwhile, various aberrations are corrected, thereby improving the resolution and the image quality of the lens assembly. A surface type of each aspheric surface x is defined by the following formula:

$$x = \frac{ch^2}{1+\sqrt{1-(k+1)c^2h^2}} + \sum A_i h^i. \quad (1)$$

TABLE 2

| Surface Number | Surface Type | Radius of Curvature | Thickness | Material Refractive Index | Abbe Number | Conic Coefficient |
|---|---|---|---|---|---|---|
| OBJ | spherical | infinite | 300.0000 | | | |
| STO | spherical | infinite | −0.4367 | | | |
| S1 | aspheric | 1.2437 | 0.5885 | 1.537 | 56.11 | −0.2834 |
| S2 | aspheric | 2.9347 | 0.4656 | | | 0.9860 |
| S3 | aspheric | 1.9600 | 0.3478 | 1.537 | 56.11 | 0.4442 |
| S4 | aspheric | 2.1089 | 0.4092 | | | −0.9566 |
| S5 | aspheric | −7.2764 | 0.2300 | 1.622 | 23.53 | −1.4837 |
| S6 | aspheric | 20.0673 | 0.8440 | | | −15.6568 |
| S7 | aspheric | −6.7138 | 0.3473 | 1.622 | 23.53 | −86.2082 |
| S8 | aspheric | 7.8582 | 0.1369 | | | −58.6017 |
| S9 | spherical | infinite | 0.2100 | 1.517 | 64.17 | |
| S10 | spherical | infinite | 0.4008 | | | |
| S11 | spherical | infinite | | | | |

Referring to Table 2, the center thickness of the first lens on the optical axis CT1 and the center thickness of the third lens on the optical axis CT3 satisfy: CT1/CT3=2.559. The center thickness of the first lens on the optical axis CT1 and the center thickness of the fourth lens on the optical axis CT4 satisfy: CT4/CT1=0.59. The radius of curvature of the image side surface of the first lens R2 and the radius of curvature of the object side surface of the second lens R3 satisfy: R2/R3=1.497. The distance from the object side surface of the first lens to the image plane on the optical axis TTL and the center thickness of the fourth lens on the optical axis CT4 satisfy: CT4/TTL=0.087. The radius of curvature of the image side surface of the first lens R2 and the radius of curvature of the image side surface of the second lens R4 satisfy: R2/R4=1.392.

When an aspheric surface is at a height h along the optical axis, x is the distance sagittal height to the vertex of the aspheric surface; c is the paraxial curvature of the aspheric surface, and c=1/R (i.e., the paraxial curvature c is the reciprocal of the radius of curvature R in Table 1 above); k is the conic coefficient (being given in Table 1 above); and Ai is the correction coefficient of the i-th order of the aspheric surface. Table 3 below shows the high-order coefficients $A_4, A_6, A_8, A_{10}, A_{12}, A_{14},$ and $A_{16}$ that can be applied to the spherical or aspheric surfaces S1-S8 of the lenses in Embodiment 1.

TABLE 3

| Surface Number | A4 | A6 | A8 | A10 | A12 | A14 | A16 |
|---|---|---|---|---|---|---|---|
| S1 | 4.2598E−03 | 8.0390E−03 | 5.6871E−03 | −5.7764E−02 | 1.3728E−01 | −1.3709E−01 | 5.3122E−02 |
| S2 | −3.7293E−03 | 8.0358E−02 | −3.8353E−01 | 1.0679E+00 | −1.5990E+00 | 1.2262E+00 | −3.5924E−01 |
| S3 | 1.5146E−02 | −4.5397E−02 | 3.4813E−01 | −3.0285E−01 | −1.2592E−01 | 6.3794E−01 | −8.9105E−02 |
| S4 | −2.9946E−02 | 4.6317E−02 | −2.9061E−01 | 6.0316E−01 | 1.0664E−01 | −1.5035E+00 | 1.1364E+00 |
| S5 | −4.7103E−01 | −4.2993E−01 | 8.6790E−01 | −3.8100E+00 | 5.7919E+00 | −5.6836E+00 | 1.9258E+00 |
| S6 | −3.0570E−01 | 1.1354E−01 | −3.1033E−01 | 7.4215E+00 | −6.5304E−01 | 4.8934E−01 | −1.6184E−01 |
| S7 | −3.2670E−01 | 3.3255E−01 | −2.6684E−01 | 6.0235E−02 | 5.4947E−02 | −3.3164E−02 | 5.1649E−03 |
| S8 | −3.1214E−01 | 3.2685E−01 | −3.1111E−01 | 1.8680E−01 | −7.0249E−02 | 1.4816E−02 | −1.3134E−03 |

Referring to Tables 1-3, the effective radius of the object side surface of the first lens DT11 and the effective radius of the object side surface of the second lens DT21 satisfy:

DT11/DT21=1.346. The axial distance from an intersection point of the image side surface of the third lens and the optical axis to a vertex of the effective radius of the image side surface of the third lens SAG32 and the center thickness of the third lens on the optical axis CT3 satisfy: SAG32/CT3=−0.413. The effective radius of the image side surface of the fourth lens DT42 and ImgH, ImgH being half a diagonal length of an effective pixel area of the electronic photosensitive element, satisfy: DT42/ImgH=0.747. The maximum angle of a ray of light incident to the electronic photosensitive assembly CRAmax, corresponding to the image height of the optical imaging system, satisfy: CRAmax=31.397.

Figure 2A:
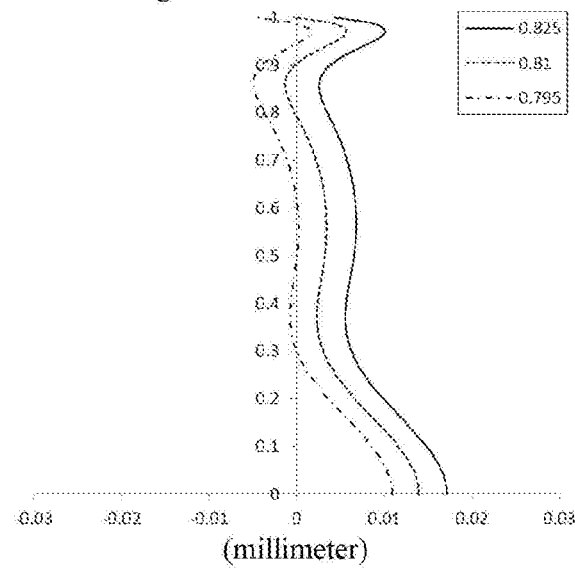
FIG. 2A illustrates a longitudinal aberration curve of the optical imaging system according to Embodiment 1.
Figure 2B:
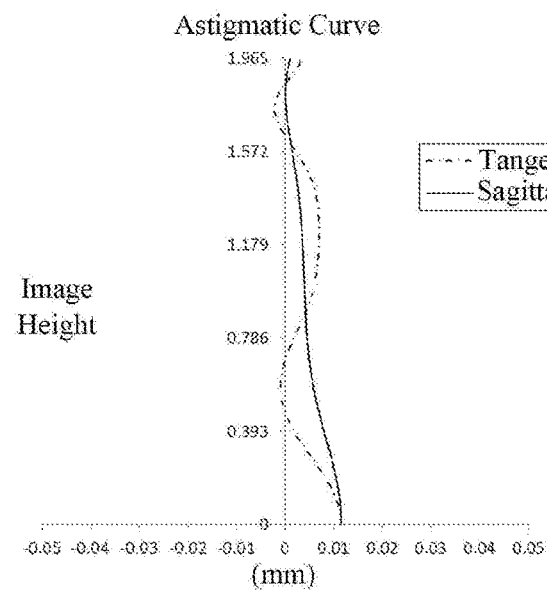
FIG. 2B illustrates an astigmatic curve of the optical imaging system according to Embodiment 1.
Figure 2C:
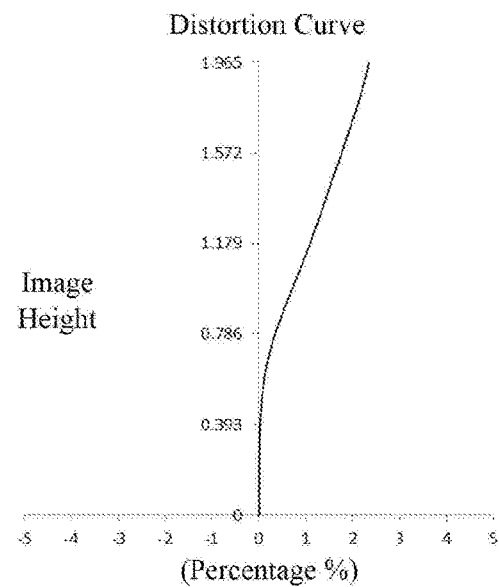
FIG. 2C illustrates a distortion curve of the optical imaging system according to Embodiment 1.
Figure 2D:
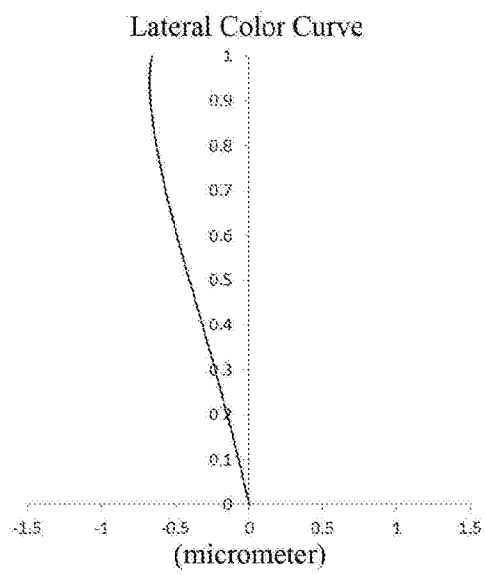
FIG. 2D illustrates a lateral color curve of the optical imaging system according to Embodiment 1.
Figure 2E:
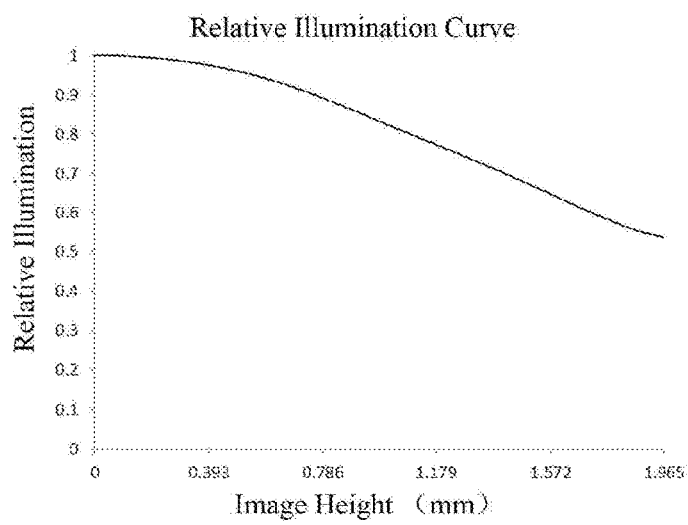
FIG. 2E illustrates a relative illumination curve of the optical imaging system according to Embodiment 1.

FIG. 2A illustrates a longitudinal aberration curve of the optical imaging system according to Embodiment 1, representing deviations of focal points of light of different wavelengths converged after passing through the optical system. FIG. 2B illustrates an astigmatic curve of the optical imaging system according to Embodiment 1, representing a curvature of a tangential image plane and a curvature of a sagittal image plane. FIG. 2C illustrates a distortion curve of the optical imaging system according to Embodiment 1, representing amounts of distortion at different viewing angles. FIG. 2D illustrates a lateral color curve of the optical imaging system according to Embodiment 1, representing deviations of different image heights on an image plane after light passes through the optical imaging system. FIG. 2E illustrates a relative illumination curve of the optical imaging system according to Embodiment 1, representing brightness of an image on the optical axis of the lens assembly (i.e., the center of a picture). In summary, it can be seen from FIGS. 2A-2E that the optical imaging system according to Embodiment 1 can achieve a high-quality image effect of high brightness and high resolution in a situation where the compactness of the optical imaging system is ensured.

Embodiment 2

Embodiment 2 of the above optical imaging system according to the present disclosure will be described below with reference to FIG. 3 to FIG. 4E. In addition to the parameters of each lens of the optical imaging system, for example, in addition to the radius of curvature, the thickness, the material, the conic coefficient, the effective focal length and the axial spacing distance of each lens, and the high-order coefficients of each mirror surface, the arrangement and structure of the optical imaging system described in Embodiment 2 and the following embodiments is the same as that in Embodiment 1. For the purpose of brevity, the description of parts similar to those in Embodiment 1 will be omitted.

Figure 3:
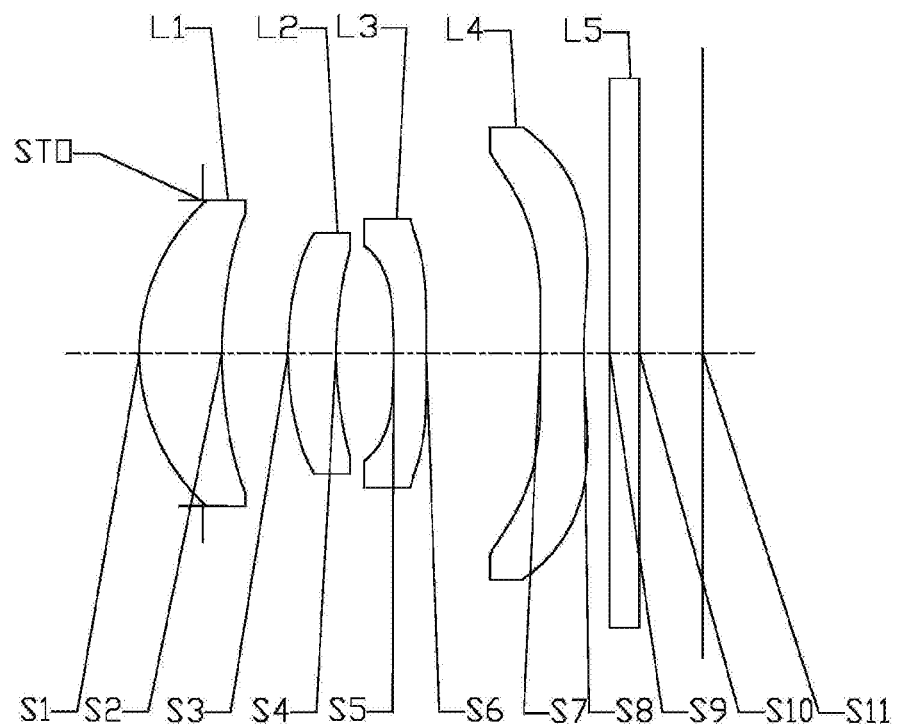
FIG. 3 illustrates a schematic structural diagram of an optical imaging system according to Embodiment 2 of the present disclosure.

FIG. 3 illustrates a schematic structural diagram of an optical imaging system according to Embodiment 2 of the present disclosure. As shown in FIG. 3, the optical imaging system according to Embodiment 2 includes the first to fourth lenses L1-L4 respectively having an object side surface and an image side surface.

Table 4 below shows the effective focal lengths of the lenses f1-f4, the effective focal length of the optical imaging system f, the half of the diagonal length of the effective pixel area of the electronic photosensitive element ImgH, the half of the maximum field-of-view angle of the optical imaging system HFOV, the f-number of the optical imaging system Fno and the total length of the optical imaging system TTL in Embodiment 2.

TABLE 4

| | Parameter | | | |
|---|---|---|---|---|
| | ImgH (mm) | HFOV (°) | Fno | f (mm) | f1 (mm) |
| Numerical Value | 1.965 | 23.985 | 2.19 | 4.229 | 3.641 |
| | Parameter | | | |
| | f2 (mm) | f3 (mm) | f4 (mm) | TTL (mm) |
| Numerical Value | 26.933 | −8.321 | −6.608 | 3.980 |

Table 5 shows the surface types, the radii of curvature, the thicknesses, the materials and the conic coefficients of the lenses in Embodiment 2.

TABLE 5

| Surface Number | Surface Type | Radius of Curvature | Thickness | Material | | Conic Coefficient |
|---|---|---|---|---|---|---|
| | | | | Refractive Index | Abbe Number | |
| OBJ | spherical | infinite | 300.0000 | | | |
| STO | spherical | infinite | −0.4456 | | | |
| S1 | aspheric | 1.2265 | 0.5836 | 1.537 | 56.11 | −0.2797 |
| S2 | aspheric | 2.7454 | 0.4660 | | | 0.7034 |
| S3 | aspheric | 1.9709 | 0.3395 | 1.537 | 56.11 | 0.1197 |
| S4 | aspheric | 2.1446 | 0.4078 | | | −1.5737 |
| S5 | aspheric | −6.1834 | 0.2300 | 1.622 | 23.53 | 0.8045 |
| S6 | aspheric | 32.0136 | 0.8055 | | | −99.0000 |
| S7 | aspheric | 10.0805 | 0.3073 | 1.537 | 56.11 | −89.9476 |
| S8 | aspheric | 2.5960 | 0.1831 | | | −30.6610 |
| S9 | spherical | infinite | 0.2100 | 1.517 | 64.17 | |
| S10 | spherical | infinite | 0.4471 | | | |
| S11 | spherical | infinite | | | | |

Table 6 below shows the high-order coefficients $A_4$, $A_6$, $A_8$, $A_{10}$, $A_{12}$, $A_{14}$, and $A_{16}$ that can be applied to the spherical or aspheric surfaces S1-S8 of the lenses in Embodiment 2.

TABLE 6

| Surface Number | A4 | A6 | A8 | A10 | A12 | A14 | A16 |
|---|---|---|---|---|---|---|---|
| S1 | 6.5522E−03 | −1.5398E−02 | 1.2197E−01 | −3.4843E−01 | 5.3559E−01 | −4.2031E−01 | 1.3626E−01 |
| S2 | −6.0400E−03 | 6.7426E−02 | −2.7188E−01 | 6.7107E−01 | −8.6524E−01 | 5.4634E−01 | −1.0163E−01 |
| S3 | 5.6533E−03 | −3.7809E−02 | 3.3792E−01 | −2.9566E−01 | −1.0947E−01 | 6.3365E−01 | −4.5668E−02 |
| S4 | −3.7367E−02 | 6.6576E−02 | −2.9776E−01 | 4.7819E−01 | 3.4924E−01 | −1.5035E+00 | 1.1364E+00 |
| S5 | −4.7684E−01 | −3.9853E−01 | 8.2541E−01 | −3.6820E+00 | 5.4735E+00 | −5.6836E+00 | 1.9258E+00 |
| S6 | −3.2187E−01 | 1.4697E−01 | −3.2673E−01 | 6.9018E−01 | −6.7204E−01 | 5.2623E−01 | −1.5823E−01 |
| S7 | −4.1196E−01 | 4.8668E−01 | −5.0309E−01 | 3.3139E−01 | −1.3026E−01 | 2.9911E−02 | −3.0396E−03 |
| S8 | −2.7445E−01 | 2.5169E−01 | −2.1836E−01 | 1.1398E−01 | −3.4204E−02 | 4.7202E−03 | −1.3689E−04 |

Figure 4A:
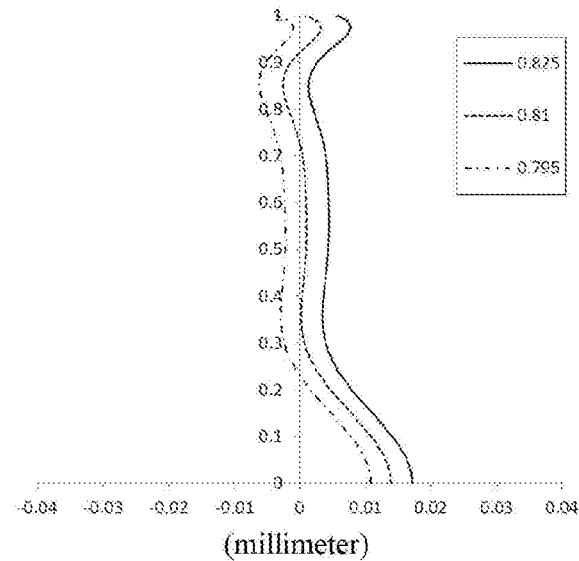
FIG. 4A illustrates a longitudinal aberration curve of the optical imaging system according to Embodiment 2.

FIG. 4A illustrates a longitudinal aberration curve of the optical imaging system according to Embodiment 2, representing deviations of focal points of light of different wavelengths converged after passing through the optical system. FIG. 4B illustrates an astigmatic curve of the optical imaging system according to Embodiment 2, representing a curvature of a tangential image plane and a curvature of a sagittal image plane. FIG. 4C illustrates a distortion curve of the optical imaging system according to Embodiment 2, representing amounts of distortion at different viewing angles. FIG. 4D illustrates a lateral color curve of the optical imaging system according to Embodiment 2, representing deviations of different image heights on an image plane after light passes through the optical imaging system. FIG. 4E illustrates a relative illumination curve of the optical imaging system according to Embodiment 2, representing brightness of an image on the optical axis of the lens assembly (i.e., the center of a picture). In summary, it can be seen from FIGS. 4A-4E that the optical imaging system according to Embodiment 2 can achieve a high-quality image effect of high brightness and high resolution in a situation where the compactness of the optical imaging system is ensured.

Embodiment 3

Figure 5:
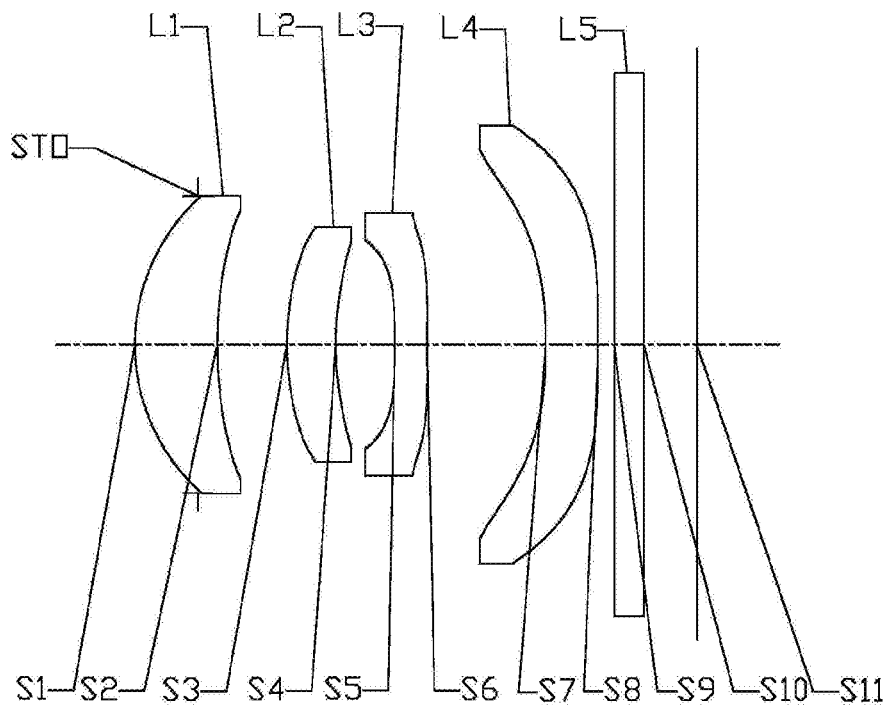
FIG. 5 illustrates a schematic structural diagram of an optical imaging system according to Embodiment 3 of the present disclosure.

Embodiment 3 of the above optical imaging system according to the present disclosure will be described below with reference to FIG. 5 to FIG. 6E. FIG. 5 illustrates a schematic structural diagram of an optical imaging system according to Embodiment 3 of the present disclosure. As shown in FIG. 5, the optical imaging system according to Embodiment 3 includes the first to fourth lenses L1-L4 respectively having an object side surface and an image side surface.

Table 7 below shows the effective focal lengths of the lenses f1-f4, the total effective focal length of the optical imaging system f, the half of the diagonal length of the effective pixel area of the electronic photosensitive element ImgH, the half of the maximum field-of-view angle of the optical imaging system HFOV, the f-number of the optical imaging system Fno and the total length of the camera lens TTL in Embodiment 3.

TABLE 7

| | Parameter | | | | |
|---|---|---|---|---|---|
| | ImgH (mm) | HFOV (°) | Fno | f (mm) | f1 (mm) |
| Numerical value | 1.965 | 23.906 | 2.20 | 4.240 | 3.639 |

| | Parameter | | | |
|---|---|---|---|---|
| | f2 (mm) | f3 (mm) | f4 (mm) | TTL (mm) |
| Numerical Value | 25.370 | −8.780 | −6.046 | 3.980 |

Table 8 shows the surface types, the radii of curvature, the thicknesses, the materials and the conic coefficients of the lenses in Embodiment 3.

TABLE 8

| Surface Number | Surface Type | Radius of Curvature | Thickness | Material Refractive Index | Material Abbe Number | Conic Coefficient |
|---|---|---|---|---|---|---|
| OBJ | spherical | infinite | 300.0000 | | | |
| STO | spherical | infinite | −0.4466 | | | |
| S1 | aspheric | 1.2356 | 0.5838 | 1.537 | 56.11 | −0.2729 |
| S2 | aspheric | 2.8072 | 0.4938 | | | 1.0000 |
| S3 | aspheric | 1.8648 | 0.3456 | 1.537 | 56.11 | 0.1583 |
| S4 | aspheric | 2.0208 | 0.4173 | | | −1.6793 |
| S5 | aspheric | −7.8367 | 0.2300 | 1.622 | 23.53 | 1.0000 |
| S6 | aspheric | 18.1585 | 0.8396 | | | −99.0000 |
| S7 | aspheric | −3.2282 | 0.3699 | 1.537 | 56.11 | −31.1540 |
| S8 | aspheric | −639.0051 | 0.1130 | | | −99.0000 |
| S9 | spherical | infinite | 0.2100 | 1.517 | 64.17 | |
| S10 | spherical | infinite | 0.3770 | | | |
| S11 | spherical | infinite | | | | |

Figure 7:
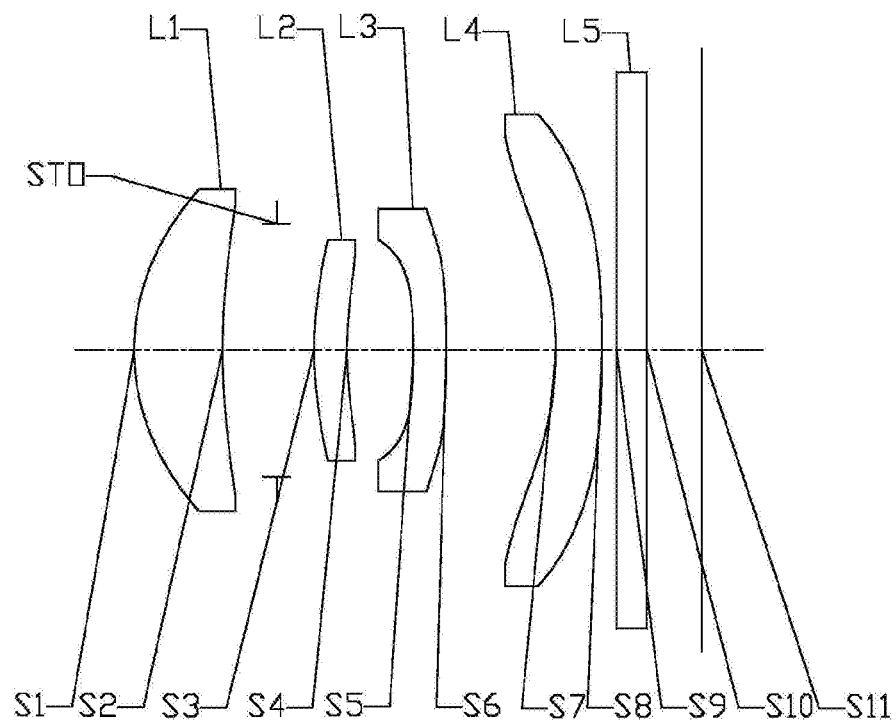
FIG. 7 illustrates a schematic structural diagram of an optical imaging system according to Embodiment 4 of the present disclosure.

Table 9 below shows the high-order coefficients $A_4$, $A_6$, $A_8$, $A_{10}$, $A_{12}$, $A_{14}$, and $A_{16}$ that can be applied to the spherical or aspheric surfaces S1-S8 of the lenses in Embodiment 3. schematic structural diagram of an optical imaging system according to Embodiment 4 of the present disclosure. As shown in FIG. 7, the optical imaging system according to Embodiment 4 includes the first to fourth lenses L1-L4 with reference to FIG. 7 to FIG. 8E. FIG. 7 illustrates a respectively having an object side surface and an image side surface.

Table 10 below shows the effective focal lengths of the lenses f1-f4, the total effective focal length of the optical imaging system f, the half of the diagonal length of the effective pixel area of the electronic photosensitive element

TABLE 9

| Surface Number | A4 | A6 | A8 | A10 | A12 | A14 | A16 |
|---|---|---|---|---|---|---|---|
| S1 | 5.2529E−03 | −1.4774E−02 | 1.2793E−01 | −3.7110E−01 | 5.7652E−01 | −4.5218E−01 | 1.4646E−01 |
| S2 | −2.5755E−03 | 3.4644E−02 | −6.3715E−02 | 6.4658E−02 | 1.1338E−01 | −2.6458E−01 | 1.6906E−01 |
| S3 | 5.1071E−03 | −2.7331E−02 | 3.3775E−01 | −2.9187E−01 | −1.1049E−01 | 6.1445E−01 | −3.1843E−02 |
| S4 | −3.8736E−02 | 6.5302E−02 | −2.7468E−01 | 4.7363E−01 | 3.4553E−01 | −1.5035E+00 | 1.1364E+00 |
| S5 | −5.0813E−01 | −4.0837E−01 | 7.0937E−01 | −3.6356E+00 | 5.7777E+00 | −5.6836E+00 | 1.9258E+00 |
| S6 | −3.2412E−01 | 1.0694E−01 | −2.9913E−01 | 7.3142E−01 | −6.4339E−01 | 5.2849E−01 | −2.1021E−01 |
| S7 | −3.3189E−01 | 3.7837E−01 | −3.6551E−01 | 1.7376E−01 | −8.8667E−03 | −1.5833E−02 | 3.3429E−03 |
| S8 | −2.5663E−01 | 2.1153E−01 | −1.4462E−01 | 2.9478E−02 | 2.0314E−02 | −1.3612E−02 | 2.3794E−03 |

Figure 6A:
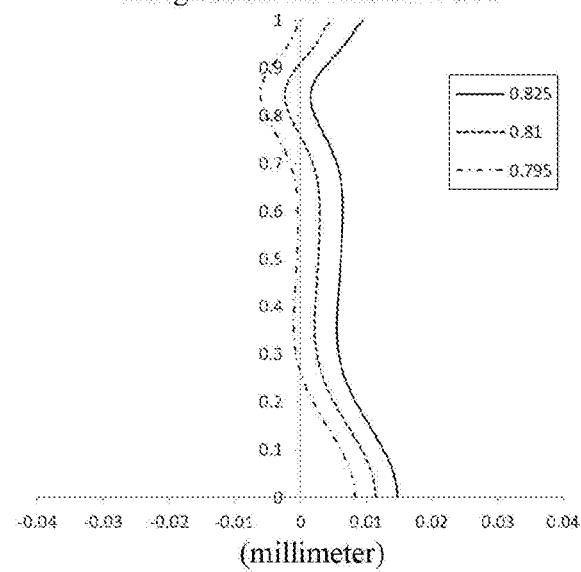
FIG. 6A illustrates a longitudinal aberration curve of the optical imaging system according to Embodiment 3.

FIG. 6A illustrates a longitudinal aberration curve of the optical imaging system according to Embodiment 3, representing deviations of focal points of light of different wavelengths converged after passing through the optical imaging system. FIG. 6B illustrates an astigmatic curve of the optical system according to Embodiment 3, representing a curvature of a tangential image plane and a curvature of a sagittal image plane. FIG. 6C illustrates a distortion curve of the optical imaging system according to Embodiment 3, representing amounts of distortion at different viewing angles. FIG. 6D illustrates a lateral color curve of the optical imaging system according to Embodiment 3, representing deviations of different image heights on an image plane after light passes through the optical imaging system. FIG. 6E illustrates a relative illumination curve of the optical imaging system according to Embodiment 3, representing brightness of an image on the optical axis of the lens assembly (i.e., the center of a picture). In summary, it can be seen from FIGS. 6A-6E that the optical imaging system according to Embodiment 3 can achieve a high-quality image effect of high brightness and high resolution in a situation where the compactness of the optical imaging system is ensured.

ImgH, the half of the maximum field-of-view angle of the optical imaging system HFOV, the f-number of the optical imaging system Fno and the total length of the camera lens TTL in Embodiment 4.

TABLE 10

| | Parameter | | | | |
|---|---|---|---|---|---|
| | ImgH (mm) | HFOV (°) | Fno | f (mm) | f1 (mm) |
| Numerical Value | 1.965 | 24.022 | 2.19 | 4.232 | 3.344 |

| | Parameter | | | |
|---|---|---|---|---|
| | f2 (mm) | f3 (mm) | f4 (mm) | TTL (mm) |
| Numerical Value | 194.998 | −13.152 | −4.853 | 3.980 |

Embodiment 4

Embodiment 4 of the above optical imaging system according to the present disclosure will be described below Table 11 shows the surface types, the radii of curvature, the thicknesses, the materials and the conic coefficients of the lenses in Embodiment 4.

TABLE 11

| Surface Number | Surface Type | Radius of Curvature | Thickness | Material Refractive Index | Abbe Number | Conic Coefficient |
|---|---|---|---|---|---|---|
| OBJ | spherical | infinite | 260.0000 | | | |
| S1 | aspheric | 1.3317 | 0.6214 | 1.537 | 56.11 | −0.0576 |
| S2 | aspheric | 4.3172 | 0.3788 | | | −28.3241 |
| STO | spherical | infinite | 0.2622 | | | |
| S3 | aspheric | 2.3086 | 0.2300 | 1.537 | 56.11 | 0.3280 |
| S4 | aspheric | 2.2785 | 0.4669 | | | 0.3446 |
| S5 | aspheric | −4.2961 | 0.2300 | 1.622 | 23.53 | 1.0000 |
| S6 | aspheric | −9.2442 | 0.7684 | | | −46.8962 |
| S7 | aspheric | −2.0717 | 0.3222 | 1.537 | 56.11 | −3.0032 |
| S8 | aspheric | −10.6683 | 0.1052 | | | −30.9666 |
| S9 | spherical | infinite | 0.2100 | 1.517 | 64.17 | |

TABLE 11-continued

| Surface Number | Surface Type | Radius of Curvature | Thickness | Material Refractive Index | Abbe Number | Conic Coefficient |
|---|---|---|---|---|---|---|
| S10 | spherical | infinite | 0.3848 | | | |
| S11 | spherical | infinite | | | | |

Table 12 below shows the high-order coefficients $A_4$, $A_6$, $A_8$, $A_{10}$, $A_{12}$, $A_{14}$, and $A_{16}$ that can be applied to the spherical or aspheric surfaces S1-S8 of the lenses in Embodiment 4.

TABLE 12

| Surface Number | A4 | A6 | A8 | A10 | A12 | A14 | A16 |
|---|---|---|---|---|---|---|---|
| S1 | −1.2762E−02 | −2.1151E−02 | 1.6782E−02 | −2.4137E−02 | 7.1846E−03 | −1.5325E−03 | 0.0000E+00 |
| S2 | 3.1977E−02 | −5.7865E−02 | 8.3184E−02 | −1.0469E−01 | 7.3509E−02 | −1.9755E−02 | 0.0000E+00 |
| S3 | −6.7136E−02 | −3.4551E−01 | 2.1253E+00 | −6.2494E+00 | 9.7710E+00 | −6.2966E+00 | 0.0000E+00 |
| S4 | −1.4229E−01 | −2.8744E−01 | 1.2418E+00 | −4.0581E+00 | 6.8061E+00 | −5.3201E+00 | 0.0000E+00 |
| S5 | −3.1293E−01 | −7.9039E−01 | 2.0954E+00 | −7.3127E+00 | 1.1542E+01 | −9.3772E+00 | 0.0000E+00 |
| S6 | −1.2963E−01 | −2.3996E−01 | 4.8940E−01 | −6.2835E−01 | 6.7012E−01 | −2.6628E−01 | 0.0000E+00 |
| S7 | −8.7783E−02 | 1.0282E−01 | −3.9235E−02 | 7.8333E−03 | −8.4456E−04 | 4.5935E−05 | −9.8600E−07 |
| S8 | −1.2169E−01 | 6.2009E−02 | −2.3881E−02 | 4.2808E−03 | −3.9067E−04 | 1.8220E−05 | −3.5013E−07 |

Figure 8A:
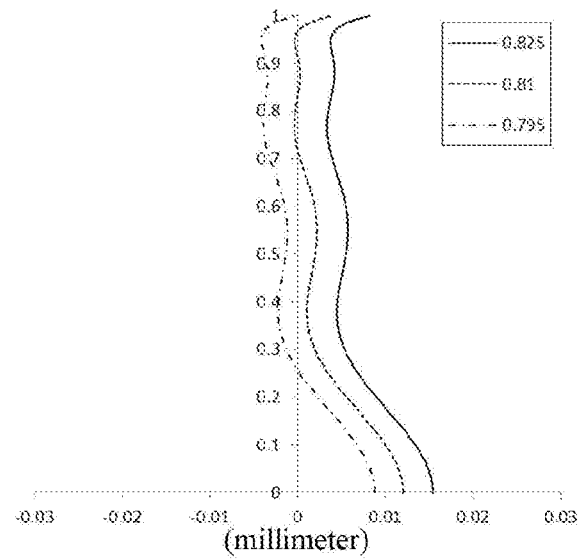
FIG. 8A illustrates a longitudinal aberration curve of the optical imaging system according to Embodiment 4.
Figure 8B:
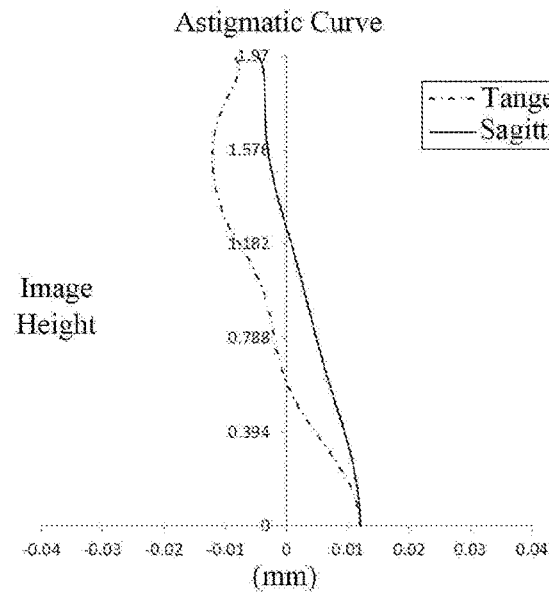
FIG. 8B illustrates an astigmatic curve of the optical imaging system according to Embodiment 4.
Figure 8C:
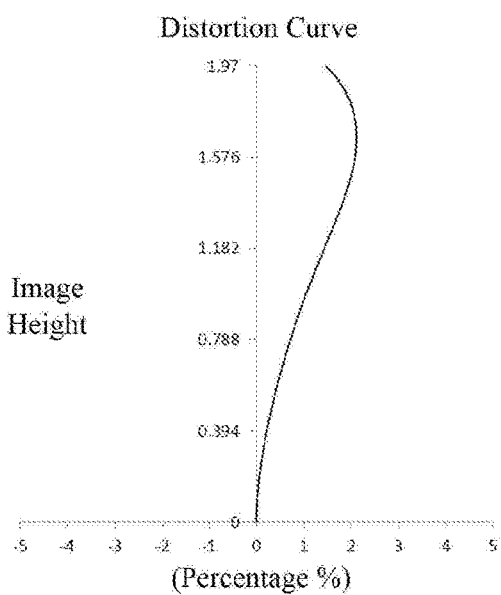
FIG. 8C illustrates a distortion curve of the optical imaging system according to Embodiment 4.
Figure 8D:
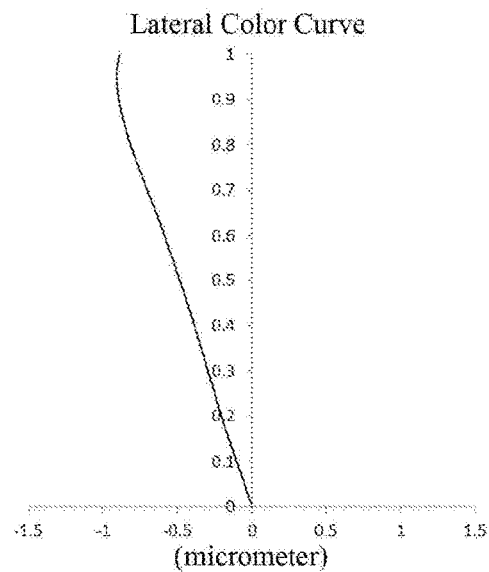
FIG. 8D illustrates a lateral color curve of the optical imaging system according to Embodiment 4.
Figure 8E:
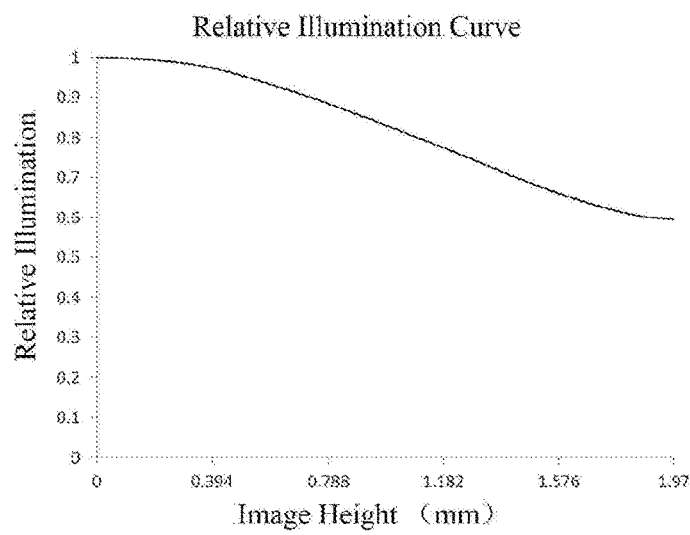
FIG. 8E illustrates a relative illumination curve of the optical imaging system according to Embodiment 4.

FIG. 8A illustrates a longitudinal aberration curve of the optical imaging system according to Embodiment 4, representing deviations of focal points of light of different wavelengths converged after passing through the optical imaging system. FIG. 8B illustrates an astigmatic curve of the optical system according to Embodiment 4, representing a curvature of a tangential image plane and a curvature of a sagittal image plane. FIG. 8C illustrates a distortion curve of the optical imaging system according to Embodiment 4, representing amounts of distortion at different viewing angles. FIG. 8D illustrates a lateral color curve of the optical imaging system according to Embodiment 4, representing deviations of different image heights on an image plane after light passes through the optical imaging system. FIG. 8E illustrates a relative illumination curve of the optical imaging system according to Embodiment 4, representing brightness of an image on the optical axis of the lens assembly (i.e., the center of a picture). In summary, it can be seen from FIGS. 8A-8E that the optical imaging system according to Embodiment 4 can achieve a high-quality image effect of high brightness and high resolution in a situation where the compactness of the optical imaging system is ensured.

Embodiment 5

Figure 9:
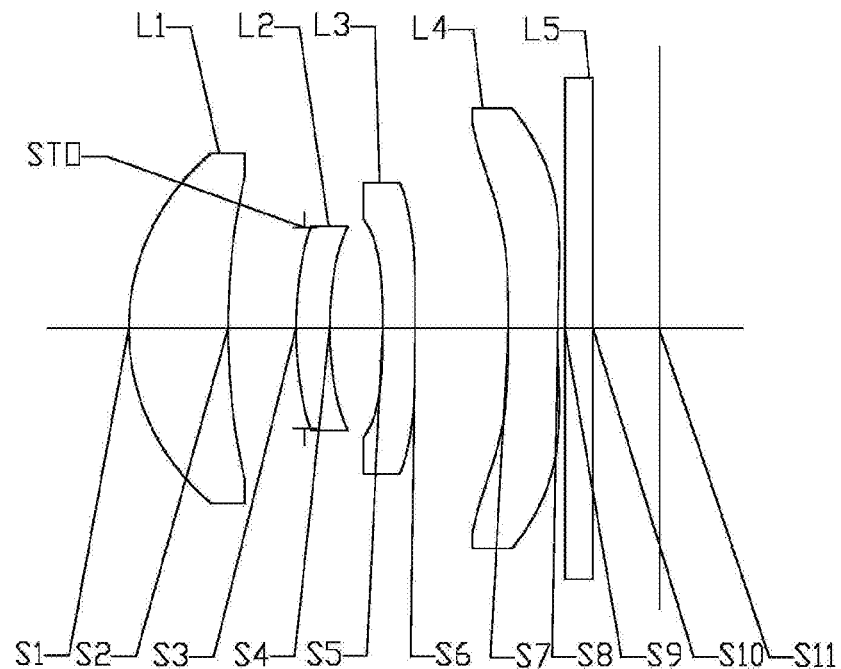
FIG. 9 illustrates a schematic structural diagram of an optical imaging system according to Embodiment 5 of the present disclosure.

Embodiment 5 of the above optical imaging system according to the present disclosure will be described below with reference to FIG. 9 to FIG. 10E. FIG. 9 illustrates a schematic structural diagram of an optical imaging system according to Embodiment 5 of the present disclosure. As shown in FIG. 9, the optical imaging system according to Embodiment 5 includes the first to fourth lenses L1-L4 respectively having an object side surface and an image side surface.

Table 13 below shows the effective focal lengths of the lenses f1-f4, the total effective focal length of the optical imaging system f, the half of the diagonal length of the effective pixel area of the electronic photosensitive element ImgH, the half of the maximum field-of-view angle of the optical imaging system HFOV, the f-number of the optical imaging system Fno and the total length of the camera lens TTL in Embodiment 5.

TABLE 13

| | Parameter | | | | |
|---|---|---|---|---|---|
| | ImgH (mm) | HFOV (°) | Fno | f (mm) | f1 (mm) |
| Numerical Value | 1.815 | 22.529 | 2.24 | 4.256 | 3.193 |

| | Parameter | | | |
|---|---|---|---|---|
| | f2 (mm) | f3 (mm) | f4 (mm) | TTL (mm) |
| Numerical Value | −30.418 | −9.793 | −6.477 | 3.973 |

Table 14 shows the surface types, the radii of curvature, the thicknesses, the materials and the conic coefficients of the lenses in Embodiment 5.

TABLE 14

| Surface Number | Surface Type | Radius of Curvature | Thickness | Material Refractive Index | Abbe Number | Conic Coefficient |
|---|---|---|---|---|---|---|
| OBJ | spherical | infinite | 260.0000 | | | |
| S1 | aspheric | 1.2778 | 0.7436 | 1.528 | 55.78 | −0.3259 |
| S2 | aspheric | 4.2149 | 0.5728 | | | 6.7683 |
| STO | spherical | infinite | −0.0629 | | | |
| S3 | aspheric | 2.4455 | 0.2500 | 1.528 | 55.78 | 2.5172 |

TABLE 14-continued

| Surface Number | Surface Type | Radius of Curvature | Thickness | Material Refractive Index | Abbe Number | Conic Coefficient |
|---|---|---|---|---|---|---|
| S4 | aspheric | 2.0473 | 0.3953 | | | 2.8462 |
| S5 | aspheric | −7.2354 | 0.2430 | 1.622 | 23.53 | 25.0132 |
| S6 | aspheric | 38.7520 | 0.6982 | | | 50.0000 |
| S7 | aspheric | −32.1547 | 0.3700 | 1.528 | 55.78 | 50.0000 |
| S8 | aspheric | 3.8425 | 0.0530 | | | −99.9900 |
| S9 | spherical | infinite | 0.2100 | 1.517 | 64.17 | |
| S10 | spherical | infinite | 0.5000 | | | |
| S11 | spherical | infinite | | | | |

Table 15 below shows the high-order coefficients $A_4$, $A_6$, $A_8$, $A_{10}$, $A_{12}$, $A_{14}$, and $A_{16}$ that can be applied to the spherical or aspheric surfaces S1-S8 of the lenses in Embodiment 5.

TABLE 15

| Surface Number | A4 | A6 | A8 | A10 | A12 | A14 | A16 |
|---|---|---|---|---|---|---|---|
| S1 | 1.8752E−02 | −5.1040E−02 | 1.2377E−01 | −1.3354E−01 | 5.6256E−02 | 1.1079E−02 | −1.1860E−02 |
| S2 | −1.4825E−03 | 4.4649E−04 | 1.1817E−02 | −3.3963E−02 | 3.7787E−02 | −2.8131E−02 | 6.7750E−03 |
| S3 | 6.5526E−02 | −2.9416E−01 | 1.7133E+00 | −2.6488E+00 | −2.1044E+00 | 1.1070E+01 | −8.9033E+00 |
| S4 | −2.8042E−02 | 4.9982E−01 | −2.0348E+00 | 5.1222E+00 | 2.1632E+00 | −2.7349E+01 | 3.2299E+01 |
| S5 | −2.7561E−01 | −1.0730E+00 | 7.1781E+00 | −3.0890E+01 | 7.7208E+01 | −1.0338E+02 | 5.4734E+01 |
| S6 | −2.6455E−01 | 4.3708E−01 | −1.8219E+00 | 5.3347E+00 | −8.3698E+00 | 6.6714E+00 | −2.1750E+00 |
| S7 | −4.0948E−01 | 7.3790E−01 | −1.1939E+00 | 1.2722E+00 | −7.6319E−01 | 2.3757E−01 | −3.0083E−02 |
| S8 | −2.2991E−01 | 2.1209E−01 | −1.9481E−01 | 8.9887E−02 | −9.9298E−03 | −5.2622E−03 | 1.2885E−03 |

Figure 10A:
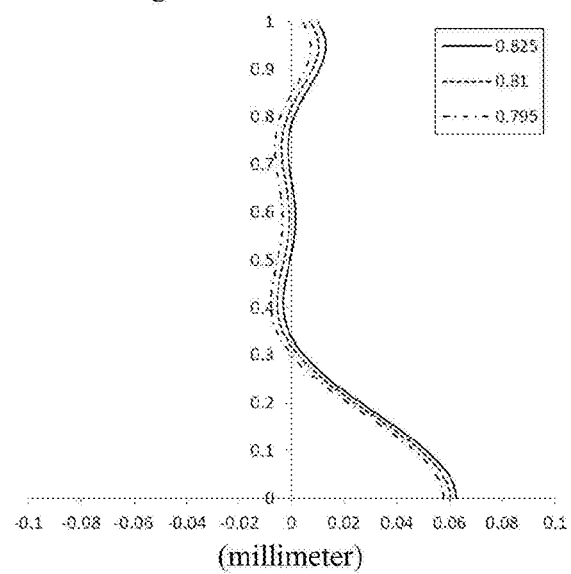
FIG. 10A illustrates a longitudinal aberration curve of the optical imaging system according to Embodiment 5.

FIG. 10A illustrates a longitudinal aberration curve of the optical imaging system according to Embodiment 5, representing deviations of focal points of light of different wavelengths converged after passing through the optical imaging system. FIG. 10B illustrates an astigmatic curve of the optical system according to Embodiment 5, representing a curvature of a tangential image plane and a curvature of a sagittal image plane. FIG. 10C illustrates a distortion curve of the optical imaging system according to Embodiment 5, representing amounts of distortion at different viewing angles. FIG. 10D illustrates a lateral color curve of the optical imaging system according to Embodiment 5, representing deviations of different image heights on an image plane after light passes through the optical imaging system. FIG. 10E illustrates a relative illumination curve of the optical imaging system according to Embodiment 5, representing brightness of an image on the optical axis of the lens assembly (i.e., the center of a picture). In summary, it can be seen from FIGS. 10A-10E that the optical imaging system according to Embodiment 5 can achieve a high-quality image effect of high brightness and high resolution in a situation where the compactness of the optical imaging system is ensured.

To sum up, with reference to Table 1 to Table 15, the parameters in Embodiment 1 to Embodiment 5 may respectively satisfy the relations shown in Table 16 below.

TABLE 16

| Conditional expression | Embodiment/ 1 | 2 | 3 | 4 | 5 |
|---|---|---|---|---|---|
| f3/f4 | 1.484 | 1.259 | 1.452 | 2.710 | 1.512 |
| CT4/TTL | 0.087 | 0.077 | 0.093 | 0.081 | 0.093 |

TABLE 16-continued

| Conditional expression | Embodiment/ 1 | 2 | 3 | 4 | 5 |
|---|---|---|---|---|---|
| (f1 + f4)/f | −0.517 | −0.702 | −0.568 | −0.356 | −0.772 |
| R2/R3 | 1.497 | 1.393 | 1.505 | 1.870 | 1.724 |
| CRAmax (°) | 31.397 | 31.884 | 31.640 | 31.710 | 33.575 |
| (f3 + 30f4)/f | −3.386 | −3.530 | −3.497 | −4.254 | −3.823 |
| CT1/CT3 | 2.559 | 2.538 | 2.538 | 2.702 | 3.060 |
| R2/R4 | 1.392 | 1.280 | 1.389 | 1.895 | 2.059 |
| CT4/CT1 | 0.590 | 0.527 | 0.634 | 0.518 | 0.498 |
| DT11/DT21 | 1.346 | 1.271 | 1.269 | 1.470 | 1.714 |
| DT42/ImgH | 0.747 | 0.744 | 0.742 | 0.782 | 0.784 |
| SAG32/CT3 | −0.413 | −0.492 | −0.458 | −0.601 | −0.481 |
| TTL/f | 0.940 | 0.941 | 0.939 | 0.940 | 0.934 |

Exemplary embodiments of the present disclosure are described above with reference to the accompany drawings. It should be appreciated by those skilled in the art that the above exemplary embodiments are merely examples taken for the purpose of illustration, rather than the limitation to the scope of the present disclosure. Any modification and equivalent substitutions, etc. made within the protection scope of the teachings and claims of the present disclosure shall be included in the protection scope claimed by the present disclosure.

What is claimed is:

1. An optical imaging system, the optical imaging system comprising with a first lens, a second lens, a third lens and a fourth lens which are sequentially arranged from an object side to an imaging side along an optical axis,
   wherein the first lens has a positive refractive power, an object side surface of the first lens is a convex surface, and an image side surface of the first lens is a concave surface;

an object side surface of the second lens is a convex surface, and an image side surface of the second lens is a concave surface; and the third lens and the fourth lens have negative refractive powers, wherein an effective focal length of the first lens f1, an effective focal length of the fourth lens f4, and an effective focal length of the optical imaging system f satisfy: $-0.8<(f1+f4)/f<0$; and a radius of curvature of the image side surface of the first lens R2 and a radius of curvature of the image side surface of the second lens R4 satisfy: $1<R2/R4<2.1$.

2. The optical imaging system according to claim 1, wherein the radius of curvature of the image side surface of the first lens R2 and a radius of curvature of the object side surface of the second lens R3 satisfy: $1.3<R2/R3<1.9$.

3. The optical imaging system according to claim 1, wherein an effective focal length of the third lens f3 and an effective focal length of the fourth lens f4 satisfy: $1<f3/f4<3$.

4. The optical imaging system according to claim 1, wherein an effective radius of the object side surface of the first lens DT11 and an effective radius of the object side surface of the second lens DT21 satisfy: $1.2<DT11/DT21<1.8$.

5. The optical imaging system according to claim 1, wherein an axial distance from an intersection point of an image side surface of the third lens and the optical axis to a vertex of an effective radius of the image side surface of the third lens SAG32 and a center thickness of the third lens on the optical axis CT3 satisfy: $-0.7<SAG32/CT3<-0.3$.

6. The optical imaging system according to claim 1, wherein a center thickness of the first lens on the optical axis CT1 and a center thickness of the third lens on the optical axis CT3 satisfy: $2.5<CT1/CT3<3.1$.

7. The optical imaging system according to claim 1, wherein a filter is arranged between the fourth lens and an image plane, and the filter is an infrared (IR) filter.

8. The optical imaging system according to claim 7, wherein a bandpass wavelength of the infrared (IR) filter ranges from 750 nm to 900 nm.

9. The optical imaging system according to claim 1, wherein a distance from the object side surface of the first lens to an image plane on the optical axis TTL and the effective focal length of the optical imaging system f satisfy: $TTL/f<1$.

10. The optical imaging system according to claim 1, wherein a center thickness of the first lens on the optical axis CT1 and a center thickness of the fourth lens on the optical axis CT4 satisfy: $0.4<CT4/CT1<0.8$.

11. An optical imaging system, the optical imaging system comprising a first lens, a second lens, a third lens and a fourth lens which are sequentially arranged from an object side to an imaging side along an optical axis, wherein the first lens has a positive refractive power, an object side surface of the first lens is a convex surface, and an image side surface of the first lens is a concave surface;

an object side surface of the second lens is a convex surface, and an image side surface of the second lens is a concave surface; and the third lens and the fourth lens have negative refractive powers, wherein a center thickness of the first lens on the optical axis CT1 and a center thickness of the fourth lens on the optical axis CT4 satisfy: $0.4<CT4/CT1<0.8$, and a radius of curvature of the image side surface of the first lens R2 and a radius of curvature of the image side surface of the second lens R4 satisfy: $1<R2/R4<2.1$.

12. The optical imaging system according to claim 11, wherein a distance from the object side surface of the first lens to an image plane on the optical axis TTL and the center thickness of the fourth lens on the optical axis CT4 satisfy: $CT4/TTL<0.1$.

13. The optical imaging system according to claim 12, wherein an effective focal length of the third lens f3 and an effective focal length of the fourth lens f4 satisfy: $1<f3/f4<3$.

14. The optical imaging system according to claim 11, wherein the radius of curvature of the image side surface of the first lens R2 and a radius of curvature of the object side surface of the second lens R3 satisfy: $1.3<R2/R3<1.9$.

15. The optical imaging system according to claim 11, wherein an effective radius of an image side surface of the fourth lens DT42 and ImgH, ImgH being half a diagonal length of an effective pixel area of an electronic photosensitive element, satisfy: $0.5<DT42/ImgH<0.9$.

16. The optical imaging system according to claim 11, wherein an axial distance from an intersection point of an image side surface of the third lens and the optical axis to a vertex of an effective radius of the image side surface of the third lens SAG32 and a center thickness of the third lens on the optical axis CT3 satisfy: $-0.7<SAG32/CT3<-0.3$.

17. The optical imaging system according to claim 11, wherein an effective focal length of the third lens f3, an effective focal length of the fourth lens f4, and an effective focal length of the optical imaging system f satisfy: $-4.5<(f3+f4)/f<-3$.

18. The optical imaging system according to claim 11, wherein the center thickness of the first lens on the optical axis CT1 and a center thickness of the third lens on the optical axis CT3 satisfy: $2.5<CT1/CT3<3.1$.

19. The optical imaging system according to claim 11, wherein a distance from the object side surface of the first lens to an image plane on the optical axis TTL and an effective focal length of the optical imaging system f satisfy: $TTL/f<1$.

* * * * *